(12) United States Patent
Flick

(10) Patent No.: US 6,828,694 B2
(45) Date of Patent: Dec. 7, 2004

(54) VEHICLE SECURITY SYSTEM FOR DELETING TEMPORARY MASTER REMOTE TRANSMITTER AND RELATED METHODS

(75) Inventor: Kenneth E. Flick, Douglasville, GA (US)

(73) Assignee: Omega Patents, L.L.C., Douglasville, GA (US)

(*) Notice: Subject to any disclaimer, the term of this patent is extended or adjusted under 35 U.S.C. 154(b) by 304 days.

(21) Appl. No.: 10/128,135

(22) Filed: Apr. 23, 2002

(65) Prior Publication Data
US 2003/0205935 A1 Nov. 6, 2003

(51) Int. Cl.[7] ............................................... B60R 25/04
(52) U.S. Cl. ...................................................... 307/10.5
(58) Field of Search ............................... 307/10.1–10.5; 340/5.2–5.25, 5.28, 825.34; 180/287

(56) References Cited

U.S. PATENT DOCUMENTS

| | | | | |
|---|---|---|---|---|
| 3,634,880 A | * | 1/1972 | Hawkins | 307/10.5 |
| 3,742,741 A | | 7/1973 | Cahan | 70/63 |
| 3,803,551 A | * | 4/1974 | Jordan | 307/10.5 |
| 4,143,368 A | * | 3/1979 | Route et al. | 340/543 |
| 2002/0024460 A1 | * | 2/2002 | Ghosh et al. | 342/43 |

FOREIGN PATENT DOCUMENTS

EP          75078 A  *  3/1983  ........... B60R/25/04

* cited by examiner

Primary Examiner—Gregory J. Toatley, Jr.
(74) Attorney, Agent, or Firm—Allen, Dyer, Doppelt, Milbrath & Gilchrist, P.A.

(57) ABSTRACT

A vehicle security system includes a plurality of uniquely-coded remote transmitters to be carried by a user for performing security functions on a vehicle. The uniquely-coded remote transmitters include a temporary master remote transmitter to operate a plurality of vehicles and at least one long-term remote transmitter to operate a designated vehicle. The vehicle security system also includes at least one controller for learning the uniquely-coded remote transmitters to enable performance of the security functions based upon signals received therefrom. The controller deletes the temporary master remote transmitter based upon a predetermined event and retains the at least one long-term remote transmitter.

59 Claims, 5 Drawing Sheets

VEHICLE SECURITY SYSTEM FOR DELETING TEMPORARY MASTER REMOTE TRANSMITTER AND RELATED METHODS

FIELD OF THE INVENTION

The present invention relates to the field of vehicle security systems, and, more particularly, to a vehicle security system having erasable remote transmitters.

BACKGROUND OF THE INVENTION

Vehicle security systems are widely used to perform various security-related vehicle functions. A typical vehicle security system includes a controller having a receiver connected thereto. The controller may perform security-related functions, such as locking/unlocking doors, or switching between armed and disarmed modes responsive to signals received from one or more uniquely-coded remote transmitters. The remote transmitters are typically carried by the owner of the vehicle.

The controller typically has a learning mode. When in the learning mode, the controller records the unique codes of remote transmitters that are operated in close proximity to the receiver. In other words, the controller may be placed in a temporary learning mode to learn the unique codes of one or more remote transmitters. Accordingly, signals transmitted by remote transmitters not learned by the controller will not be recognized by the receiver. A representative high-quality vehicle security system is offered, for example, by Omega Research & Development of Douglasville, Ga. under the designation EXCALIBUR® Model ATV-1000.

At a car dealership, for example, a plurality of vehicles each having different controllers that recognize different unique codes are generally positioned in the same location, e.g., on the dealership lot. The keys or remote transmitters for each of these vehicles are typically located in one central location, such as a peg board in the sales manager's office. When a sales associate needs to gain access to various vehicles positioned on the car dealership lot, it becomes necessary for the sales associate to make repetitive trips back and forth to the sales manager's office to obtain the vehicle keys. This process can be time consuming for both the sales associate and the customers.

Alternately, some dealerships attach lock boxes to vehicle windows having vehicle keys or remote transmitters therein to provide access to the vehicle. A representative vehicle lock box is illustrated in U.S. Pat. No. 3,742,741 to Cahan titled *Key Receptacle For An Automotive Vehicle*. More particularly, each of the lock boxes may be made of a high strength metal and are wedged between the top of the window and the door seal. Each of the lock boxes include a lock to prevent unauthorized access. The sales associates are provided a key to the lock so as to readily access the vehicle key within the lock box. This is disadvantageous, however, because security of the lock boxes may be easily compromised by duplicating the key to the lock box.

Vehicle security systems have been used to interface with existing remote keyless entry (RKE) systems. The RKE systems generally include a factory remote transmitter that enables a user to perform vehicle security functions, such as locking and unlocking vehicle door locks. The security system may include a plurality of remote transmitters to allow other users, such as sales associates at a car dealership, to also perform vehicle security functions, such as lock and unlock the vehicle door locks. The existing security systems are disadvantageous, however, because the remote transmitters may still be used to perform vehicle security functions after a time when the transmitters should no longer be operational, e.g., after delivery of the vehicle to a purchaser. Further, the process of erasing the transmitters and reprogramming the factory remote transmitter, so that only the factory remote transmitter may perform vehicle security functions, may be time-consuming and complicated.

SUMMARY OF THE INVENTION

In view of the foregoing background, it is therefore an object of the invention to provide a vehicle security system that allows ready access to a plurality of vehicles located in a central location and which increases security after a vehicle is delivered to a customer, for example.

These and other objects, features, and advantages in accordance with the present invention are provided by a vehicle security system for a vehicle that includes a plurality of uniquely-coded remote transmitters to be carried by a user. The plurality of uniquely-coded remote transmitters may comprise at least one temporary master remote transmitter to operate a plurality of vehicles and at least one long-term remote transmitter to operate a designated vehicle. The vehicle security system may further include at least one controller for learning the uniquely-coded remote transmitters to enable performance of a security function based upon signals received therefrom. The controller may also delete the at least one temporary master remote transmitter based upon a predetermined event and retain the at least one long-term remote transmitter.

The at least one controller may be a single controller or may include a first controller for learning the at least one long-term remote transmitter, and a second controller for learning the at least one temporary master remote transmitter. The second controller may also delete the at least one temporary master remote transmitter based upon the predetermined event. The first and second controllers may be used to control vehicle door locks and other additional vehicle security functions. The vehicle security system may further include at least one wireless receiver connected to the at least one controller.

The predetermined event may include the passage of a predetermined time, a predetermined number of consecutive communications from the long-term remote transmitter, a predetermined distance traveled by the designated vehicle, or a predetermined number of vehicle ignition cycles, for example. The controller may advantageously learn the at least one temporary master remote transmitter in a different way than the at least one long-term remote transmitter.

The vehicle may include vehicle door locks and the vehicle security function may comprise operation of the vehicle door locks. The controller may also passively relock the vehicle door locks. The vehicle may also include a vehicle security sensor and an alarm indicator connected to the controller. The security function may be switching the controller between armed and disarmed modes. When in the armed mode, the controller operates the alarm indicator responsive to the security sensor.

The vehicle may further include a valet switch connected to the controller. The controller may be switchable to a valet mode responsive to the valet switch and signals from the long-term remote transmitter, and not switchable to the valet mode responsive to the valet switch and signals from the at least one temporary master remote transmitter.

Another aspect of the invention relates to a controller for a vehicle security system. The controller may include a processor and a receiver connected thereto. The receiver may receive signals from the plurality of uniquely-coded remote transmitters to be carried by a user. The processor may learn the uniquely-coded remote transmitters to enable performance of a security function based upon signals received therefrom. The processor may also delete the at least one temporary master remote transmitter based upon a predetermined event and retain the at least one long-term remote transmitter.

A method aspect of the invention includes providing a plurality of uniquely-coded remote transmitters to be carried by a user. The method may also include learning the uniquely-coded remote transmitters into a controller to enable performance of a security function based upon signals received from the uniquely-coded remote transmitters. The method may further include deleting the at least one temporary master remote transmitter from the controller based upon a predetermined event and retaining the at least one long-term remote transmitter.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notations are used to indicate similar elements in alternative embodiments.

Figure 1:
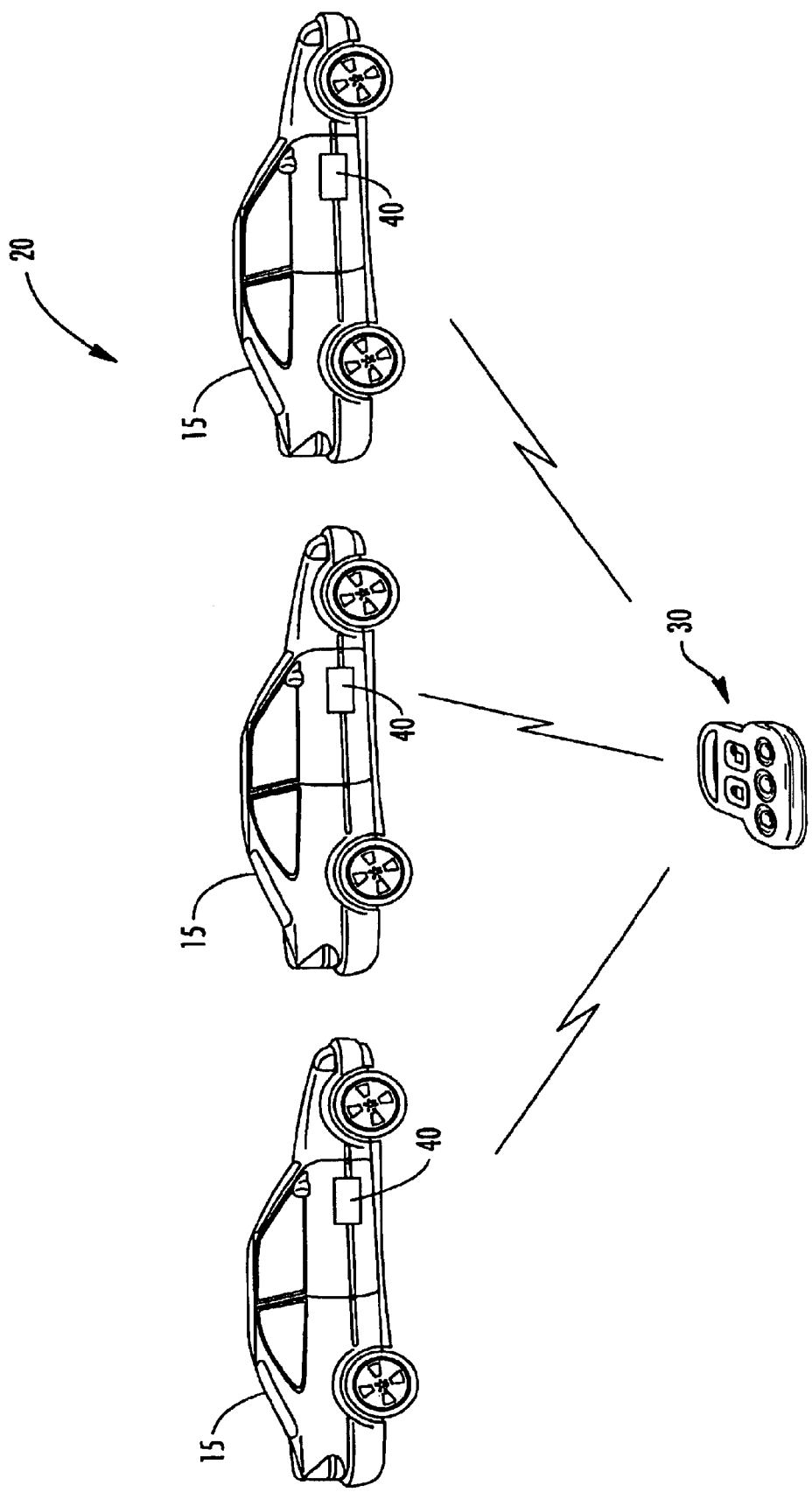
FIG. 1 is a perspective view of a plurality of vehicles each having a vehicle security system according to the present invention.
Figure 2:
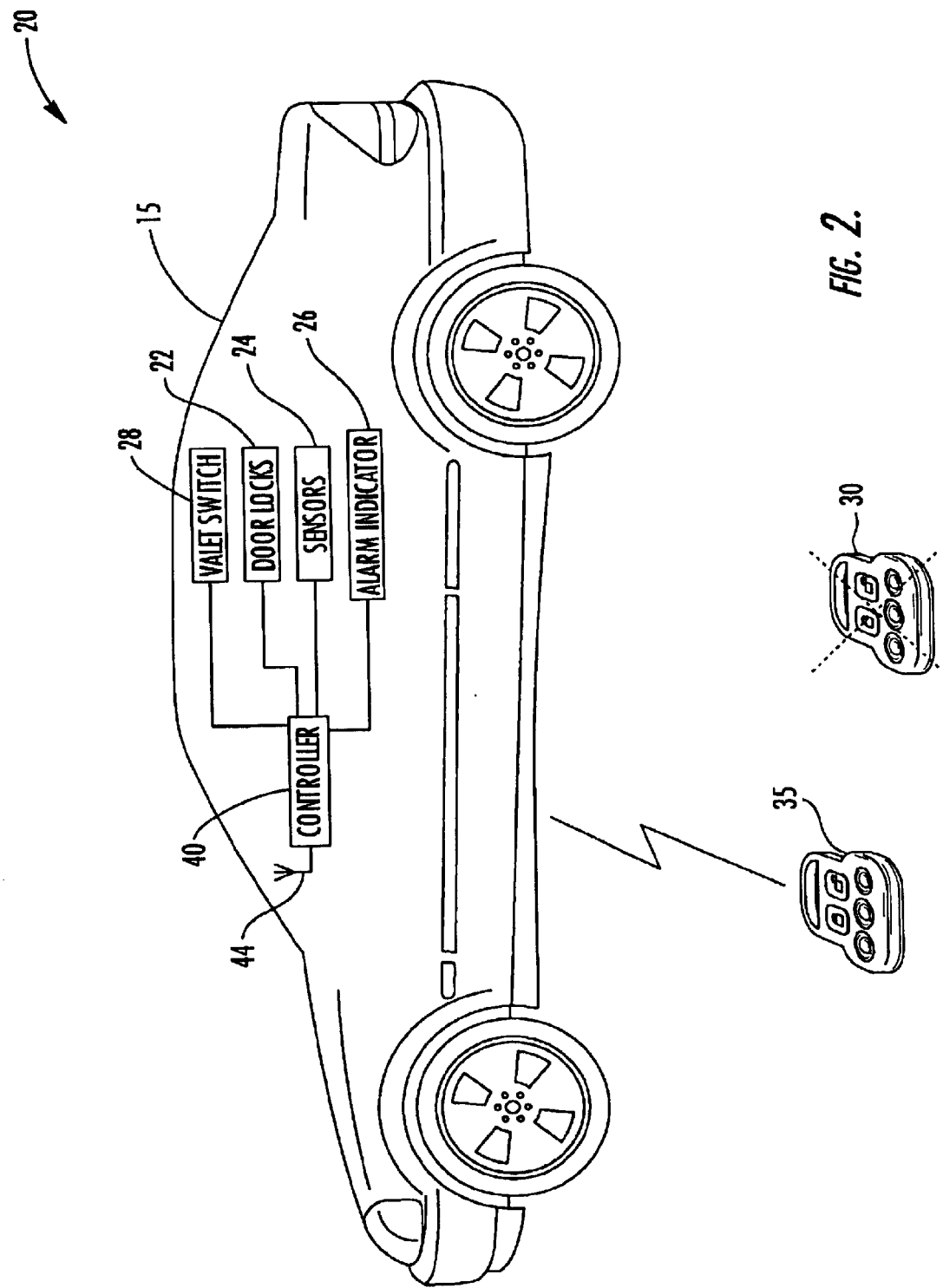
FIG. 2 is a schematic block diagram for one of the vehicles in FIG. 1 in communication with a long-term remote transmitter and showing that a temporary master remote transmitter has been deleted.
Figure 3:
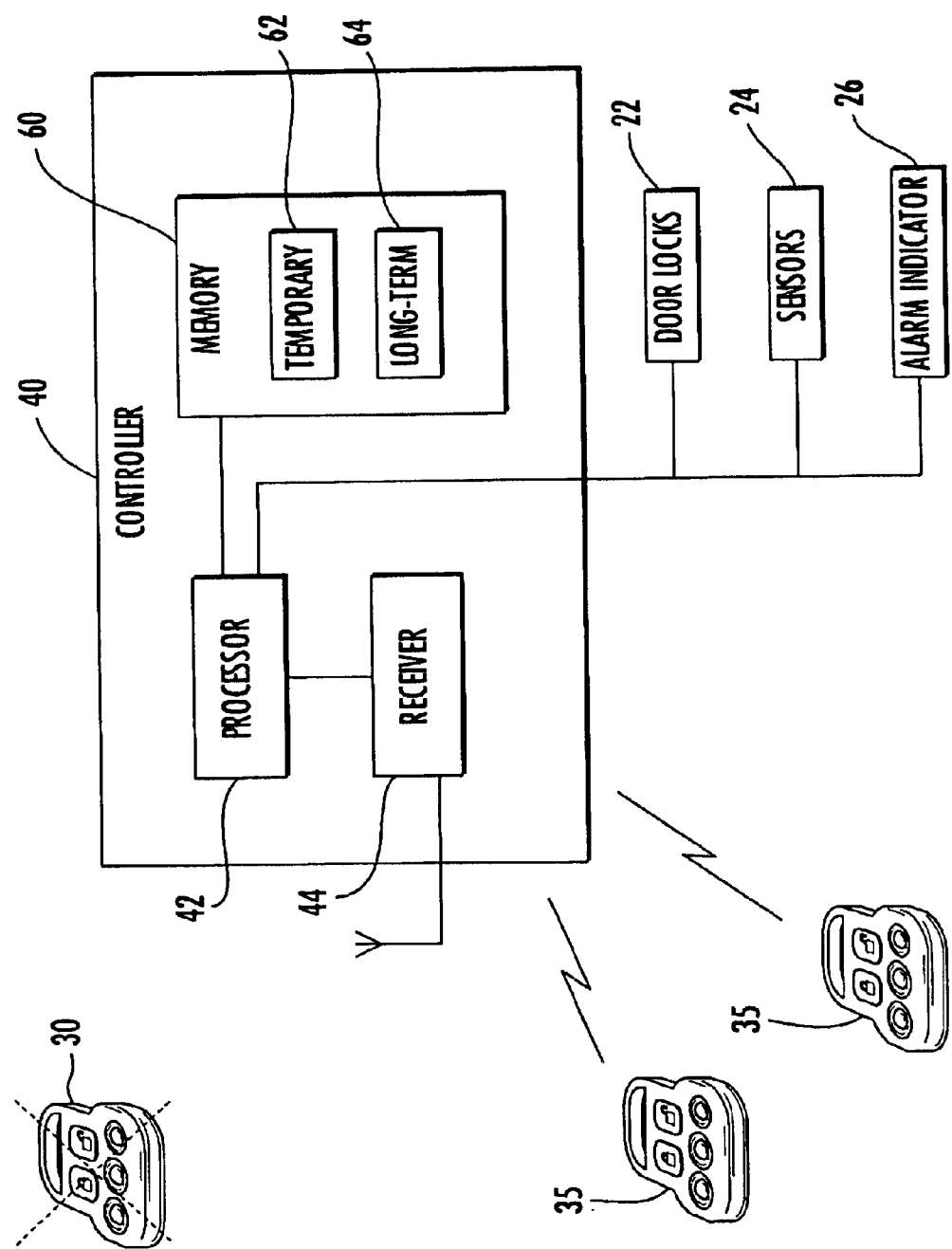
FIG. 3 is a more detailed schematic diagram of the vehicle security system controller illustrated in FIG. 2.

Referring initially to FIGS. 1–3, a vehicle security system 20 for a vehicle 15 having a controller 40 and a plurality of uniquely-coded remote transmitters to be carried by a user is now described. The plurality of uniquely-coded remote transmitters includes a temporary master remote transmitter 30 to illustratively operate a plurality of vehicles 15 and a long-term remote transmitter 35 to illustratively operate a designated vehicle 15. The temporary master remote: transmitter 30 may, for example, be used by a plurality of authorized users at a vehicle dealership, such as sales associates, for example, to gain access to vehicles.

The vehicle security system 20 may further include a plurality of temporary master remote transmitters 30 so that a plurality of sales associates may have ready access to a plurality of vehicles 15 at the vehicle dealership. Each of the uniquely-coded remote transmitters may include a unique code generator for generating the unique code as will be appreciated by those skilled in the art. The uniquely-coded remote transmitters may further include a wireless transmitter connected to the unique code generator for transmitting the unique codes to the controller 40 as will also be understood by those skilled in the art.

The vehicle security system 20 also includes at least one controller 40 for learning the uniquely-coded remote transmitters to enable performance of a security function based upon signals received therefrom. The controller 40 is illustratively connected to vehicle door locks 22, a security sensor 24, and an alarm indicator 26. Accordingly, some of the security functions that may be performed by the vehicle security system 20 include locking and unlocking the vehicle door locks 22, and operating the alarm indicator 26 responsive to the security sensor 24. The controller 40 may passively relock the vehicle door locks 22 and/or passively rearm the alarm indicator 26. The passive locking and/or arming of the respective vehicle door locks 22 and alarm indicator 26 may occur after passage of a predetermined time, for example.

Moreover, the controller 40 also deletes the temporary master remote transmitter 30 (shown in FIGS. 2 and 3 as crossed by dashed lines) based upon a predetermined event. The controller 40 may be a single controller that includes a wireless receiver 44 connected thereto for receiving signals transmitted from the uniquely-coded remote transmitters. The controller 40 also illustratively includes a memory 60 for storing the unique codes of the uniquely-coded remote transmitters. The memory 60 may illustratively be a single memory having a temporary memory location 62 and a long-term memory location 64 for storing the respective unique codes of the temporary master remote transmitter 30 and the long-term remote transmitter 35. It will be understood by those skilled in the art that the memory 60 may alternately include separated temporary and long-term memories 62, 64 for storing the respective unique codes of the temporary master and long-term remote transmitters 30, 35.

The controller 40 also includes a processor 42 connected to the wireless receiver 44 for learning the uniquely-coded remote transmitters to enable performance of a security function based upon signals received therefrom. The processor 42 deletes the uniquely-coded temporary master remote transmitters 30 upon the occurrence of the predetermined event and retains the long-term remote transmitter 35 after the temporary master remote transmitters have been deleted.

The controller 40 may learn the temporary master remote transmitter 30 in a different way than the at least one long-term remote transmitter 35 so as to enable ready identification to the uniquely-coded remote transmitters to be deleted upon the occurrence of the predetermined event.

After the temporary master remote transmitter 30 is deleted, the long-term remote transmitter 35 is retained to perform the security functions. The predetermined event upon which the temporary master remote transmitter 30 is deleted may include the passage of a predetermined time, a predetermined number of consecutive communications from the at least one long-term remote transmitter 35, a predetermined distance traveled by the designated vehicle 15, or a predetermined number of vehicle ignition cycles, or a continuation thereof for example. It will be understood by those skilled in the art that the predetermined event may include other similar events indicating that the designated vehicle 15 has been delivered to the purchaser.

The vehicle security system 20 also illustratively includes a valet switch 28 connected to the controller 40. The controller 40 is switchable to a valet mode responsive to the valet switch 28 and signals from the long-term remote transmitter 35. Further, the controller 40 is not switchable to the valet mode 28 responsive to the valet switch 28 and signals from the temporary master remote transmitter 30. This provides additional security as will be appreciated by those skilled in the art.

Figure 4:
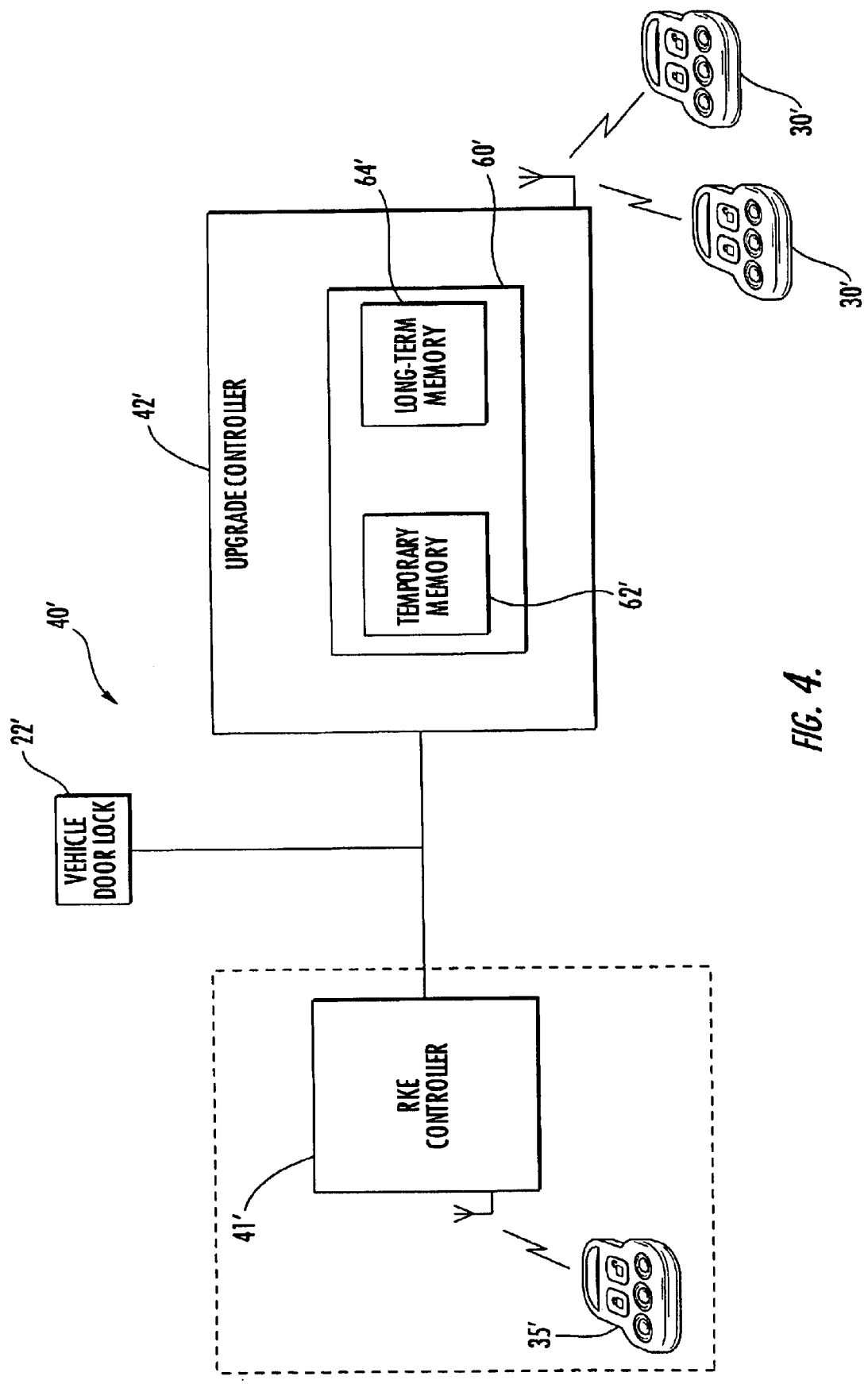
FIG. 4 is a schematic diagram of an alternate embodiment of a vehicle security system according to the present invention.

Turning now to FIG. 4, in another embodiment of the vehicle security system 20', the at least one controller 40' now includes a first controller 41' and a second controller 42'. The first controller 41' may advantageously control vehicle door locks 22' and the second controller 42' may advantageously control at least one additional vehicle security function. The first controller 41' may learn the at least one long-term remote transmitter 35' and may illustratively be a remote keyless entry (RKE) controller. The RKE controller 41' is generally a factory installed controller, and will accordingly learn the long-term remote transmitter 35' when installed at the factory.

The second controller 42' learns the temporary master remote transmitters 30' and deletes the temporary master remote transmitters based upon the predetermined event. The second controller may illustratively be an upgrade controller 30' that is installed by the vehicle dealership after the vehicle has been delivered from the factory. The upgrade controller 42' includes a memory 60' for storing the unique codes of the long-term remote transmitter 35' and the temporary master remote transmitter 30'. The memory 60' illustratively includes a temporary memory 62' and a long-term memory 64'. The temporary and long-term memories 62', 64' may be different memory locations within the memory 60' or may be separate memories. Of course, in this embodiment, the system 40' may not use the long-term memory 64'. Instead, the memory of the RKE controller 41' functionally serves as the long-term memory. In some embodiments, both the temporary memory 62' and long-term memory 64' of the upgrade controller 42' may be deleted based upon an event, such as a number of RKE cycles, e.g., twenty cycles.

Figure 5:
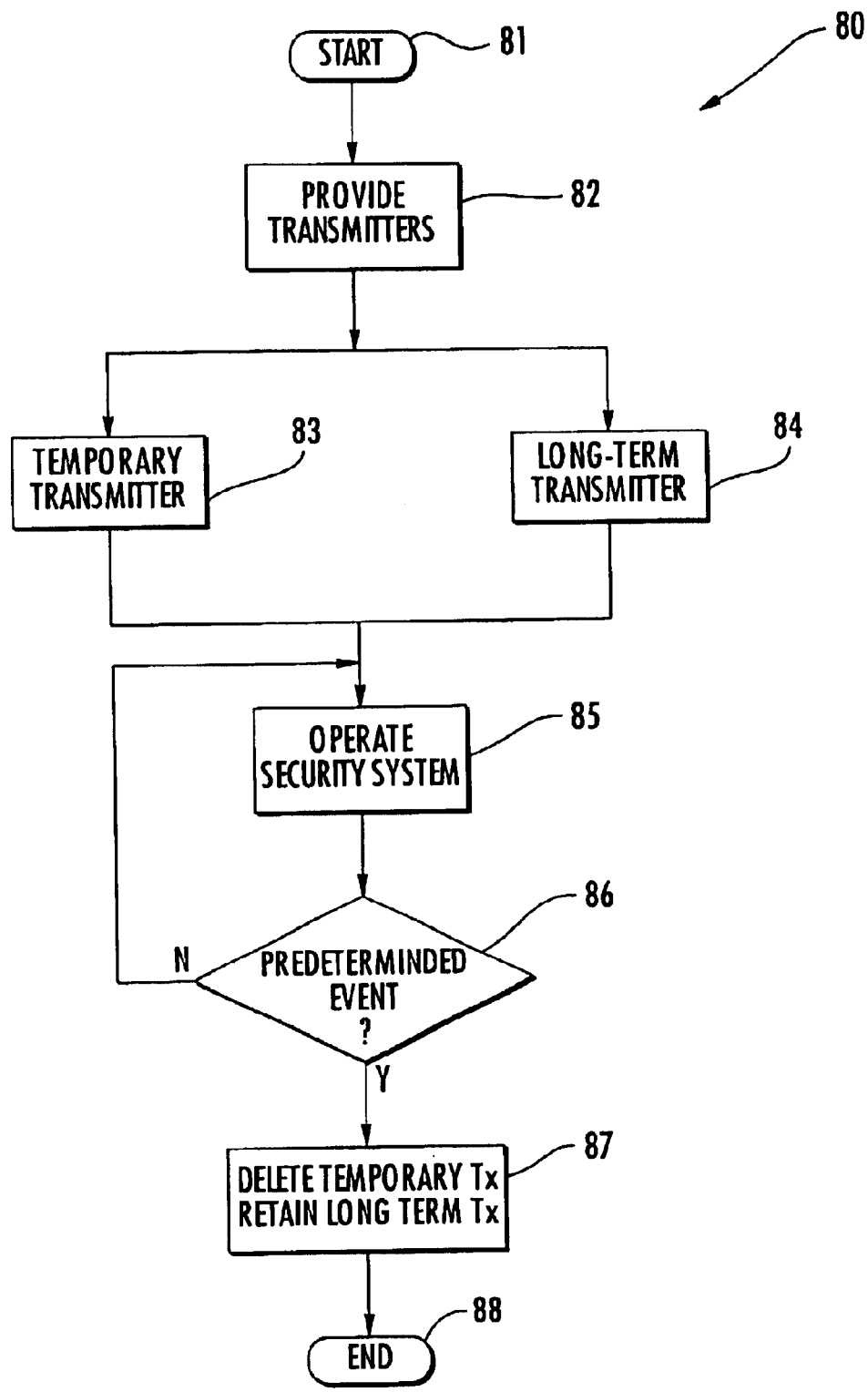
FIG. 5 is a flow chart showing operation of a vehicle security system illustrated in FIG. 1.

Turning now, additionally to the flow chart 80 of FIG. 5, a method aspect of operating the vehicle security system 20 is further described. From the start (Block 81) the method of operating the vehicle security system 20 includes providing a plurality of uniquely-coded remote transmitters at Block 82. Providing the uniquely-coded remote transmitters may include providing a temporary master remote transmitter 30 at Block 83 and a long-term remote transmitter 35 at Block 84. The vehicle security system 20 is operated at Block 85. At Block 86, it is determined whether the predetermined event has occurred. If the predetermined event has not occurred, then the vehicle security system 20 continues to operate at Block 85. If, however, the predetermined event has occurred, then the temporary master remote transmitter 30 is deleted and the long-term remote transmitter 35 is retained at Block 87. The method is completed at Block 88.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims. The unique codes stored in the temporary memory 62' may be readily deleted based upon the occurrence of a predetermined event.

That which is claimed is:

1. A vehicle security system comprising:
   a plurality of uniquely-coded remote transmitters comprising at least one temporary master remote transmitter to operate a plurality of vehicles and at least one long-term remote transmitter to operate a designated vehicle; and
   at least one controller for installation in the designated vehicle, for learning respective codes of said uniquely-coded remote transmitters to enable performance of a security function based upon signals received therefrom, and for deleting the respective at least one code of the at least one temporary master remote transmitter based upon a predetermined event and while retaining the respective at least one code of the at least one long-term remote transmitter.

2. A vehicle security system according to claim 1 wherein said at least one controller comprises a single controller.

3. A vehicle security system according to claim 1 wherein said at least one controller comprises:
   a first controller for learning the at least one respective code of the at least one long-term remote transmitter; and
   a second controller for learning the at least one respective code of the at least one temporary master remote transmitter and for deleting the at least one respective code of the at least one temporary master remote transmitter based upon the predetermined event.

4. A vehicle security system according to claim 1 wherein said at least one controller comprises:
   a first controller for controlling vehicle door locks; and
   a second controller for controlling at least one additional vehicle security function.

5. A vehicle security system according to claim 1 further comprising at least one wireless receiver connected to said at least one controller.

6. A vehicle security system according to claim 1 wherein the predetermined event comprises the passage of a predetermined time.

7. A vehicle security system according to claim 1 wherein the predetermined event comprises a predetermined number of consecutive communications from the at least one long-term remote transmitter.

8. A vehicle security system according to claim 1 wherein the predetermined event comprises a predetermined distance traveled by the designated vehicle.

9. A vehicle security system according to claim 1 wherein the predetermined event comprises a predetermined number of vehicle ignition cycles.

10. A vehicle security system according to claim 1 wherein said at least one controller learns the at least one respective code of the at least one temporary master remote transmitter in a different way than the at least one respective code of the at least one long-term remote transmitter.

11. A vehicle security system according to claim 1 wherein said at least one controller comprises a memory for storing the respective unique codes of said uniquely-coded remote transmitters.

12. A vehicle security system according to claim 1 wherein the vehicle comprises vehicle door locks; and wherein the vehicle security function comprises operation of the vehicle door locks.

13. A vehicle security system according to claim 12 wherein said at least one controller passively relocks the vehicle door locks.

14. A vehicle security system according to claim 1 wherein the vehicle comprises at least one vehicle security sensor and an alarm indicator connected to said at least one controller; and wherein the security function is switching said at least one controller between armed and disarmed modes, said at least one controller in the armed mode for operating the alarm indicator responsive to the at least one vehicle security sensor.

15. A vehicle security system according to claim 1 further comprising a valet switch connected to said at least one controller; and wherein said at least one controller is switchable to a valet mode responsive to said valet switch and signals from the at least one long-term remote transmitter, and not switchable to the valet mode responsive to said valet switch and signals from the at least one temporary master remote transmitter.

16. A vehicle security system comprising:
   a plurality of uniquely-coded remote transmitters comprising at least one temporary master remote transmitter to operate a plurality of vehicles and at least one long-term remote transmitter to operate a designated vehicle; and
   a first controller and second controller for installation in the designated vehicle, said first controller for learning at least one respective code of the at least one long-term remote transmitter and said second controller for learning at least one respective code of the at least one temporary master remote transmitter and for deleting the at least one respective code of the at least one temporary master remote transmitter based upon a predetermined event.

17. A vehicle security system according to claim 16 wherein said first controller is for controlling vehicle door locks and wherein said second controller is for controlling at least one additional vehicle security function.

18. A vehicle security system according to claim 16 further comprising respective wireless receivers connected to each controller.

19. A vehicle security system according to claim 16 wherein the predetermined event comprises the passage of a predetermined time.

20. A vehicle security system according to claim 16 wherein the predetermined event comprises a predetermined number of consecutive communications from the at least one long-term remote transmitter.

21. A vehicle security system according to claim 16 wherein the predetermined event comprises a predetermined distance traveled by the designated vehicle.

22. A vehicle security system according to claim 16 wherein the predetermined event comprises a predetermined number of vehicle ignition cycles.

23. A vehicle security system according to claim 16 wherein said at least one controller learns the at least one respective code of the at least one temporary master remote transmitter in a different way than the at least one respective code of the at least one long-term remote transmitter.

24. A vehicle security system according to claim 16 wherein said at least one controller comprises a memory for storing the respective unique codes of said uniquely-coded remote transmitters.

25. A vehicle security system according to claim 16 wherein the vehicle comprises vehicle door locks, and wherein the vehicle security function comprises operation of the vehicle door locks.

26. A controller for a vehicle security system, the controller comprising:
   a processor and a receiver connected thereto, said receiver for receiving signals from a plurality of uniquely-coded remote transmitters comprising at least one temporary master remote transmitter to operate a plurality of vehicles and at least one long-term remote transmitter to operate a designated vehicle;
   said processor for learning respective codes of the uniquely-coded remote transmitters to enable performance of a vehicle security function based upon signals received therefrom, and for deleting the at least one respective code of the at least one temporary master remote transmitter based upon a predetermined event and while retaining the at least one respective code of the at least one long-term remote transmitter.

27. A controller according to claim 26 wherein the predetermined event comprises the passage of a predetermined time.

28. A controller according to claim 26 wherein the predetermined event comprises a predetermined number of consecutive communications from the at least one long-term remote transmitter.

29. A controller according to claim 26 wherein the predetermined event comprises a predetermined distance traveled by the designated vehicle.

30. A controller according to claim 26 wherein the predetermined event comprises a predetermined number of vehicle ignition cycles.

31. A method for operating a vehicle security system comprising:
   providing a plurality of uniquely-coded remote transmitters comprising at least one temporary master remote transmitter to operate a plurality of vehicles and at least one long-term remote transmitter to operate a designated vehicle;
   learning respective codes of the uniquely-coded remote transmitters into at least one controller to enable performance of a vehicle security function based upon signals received from the uniquely-coded remote transmitters; and
   deleting the at least one respective code of the at least one temporary master remote transmitter from the at least one controller based upon a predetermined event and retaining the at least one respective code of the at least one long-term remote transmitter.

32. A method according to claim 31 wherein the at least one controller further comprises a first controller for learning the at least one respective code of the at least one long-term remote transmitter and a second controller for learning the at least one respective code of the at least one temporary master remote transmitter and for deleting the at least one respective code of the at least one temporary master remote transmitter based upon the predetermined event.

33. A method according to claim 31 wherein the predetermined event comprises the passage of a predetermined time.

34. A method according to claim 31 wherein the predetermined event comprises a predetermined number of consecutive communications from the at least one long-term remote transmitter.

35. A method according to claim 31 wherein the predetermined event comprises a predetermined distance traveled by the designated vehicle.

36. A method according to claim 31 wherein the predetermined event comprises a predetermined number of vehicle ignition cycles.

37. A method according to claim 31 wherein learning the respective codes of the uniquely-coded remote transmitters further comprises learning the at least one respective code of the at least one temporary master remote transmitter in a different way than the at least one respective code of the at least one long-term remote transmitter.

38. A vehicle security system comprising:
a plurality of uniquely-coded remote transmitters comprising at least one temporary remote transmitter and at least one long-term remote transmitted; and
at least one controller for learning respective codes of said uniquely-coded remote transmitters to enable performance of a security function based upon signals received therefrom, and for deleting the at least one respective code of the at least one temporary remote transmitter based upon a predetermined event and while retaining the at least one respective code of the at least one long-term remote transmitter.

39. A vehicle security system according to claim 38 wherein said at least one controller comprises a single controller.

40. A vehicle security system according to claim 38 wherein said at least one controller comprises:
a first controller for learning the at least one respective code of the at least one long-term remote transmitter; and
a second controller for learning the at least one respective code of the at least one temporary remote transmitter and for deleting the at least one respective code of the at least one temporary remote transmitter based upon the predetermined event.

41. A vehicle security system according to claim 38 wherein said at least one controller comprises:
a first controller for controlling vehicle door locks; and
a second controller for controlling at least one additional vehicle security function.

42. A vehicle security system according to claim 38 further comprising at least one wireless receiver connected to said at least one controller.

43. A vehicle security system according to claim 38 wherein the predetermined event comprises the passage of a predetermined time.

44. A vehicle security system according to claim 38 wherein the predetermined event comprises a predetermined number of consecutive communications from the at least one long-term remote transmitter.

45. A vehicle security system according to claim 38 wherein the predetermined event comprises a predetermined distance traveled by the vehicle.

46. A vehicle security system according to claim 38 wherein the predetermined event comprises a predetermined number of vehicle ignition cycles.

47. A vehicle security system according to claim 38 wherein said at least one controller learns the at least one respective code of the at least one temporary remote transmitter in a different way than the at least one respective code of the at least one long-term remote transmitter.

48. A vehicle security system according to claim 38 wherein said at least one controller comprises a memory for storing the respective unique codes of said uniquely-coded remote transmitters.

49. A vehicle security system according to claim 38 wherein the vehicle comprises vehicle door locks; and wherein the vehicle security function comprises operation of the vehicle door locks.

50. A vehicle security system according to claim 49 wherein said at least one controller passively relocks the vehicle door locks.

51. A vehicle security system according to claim 38 wherein the vehicle comprises at least one vehicle security sensor and an alarm indicator connected to said at least one controller; and wherein the security function is switching said at least one controller between armed and disarmed modes, said at least one controller in the armed mode for operating the alarm indicator responsive to the at least one vehicle security sensor.

52. A vehicle security system according to claim 38 further comprising a valet switch connected to said at least one controller; and wherein said at least one controller is switchable to a valet mode responsive to said valet switch and signals from the at least one long-term remote transmitter, and not switchable to the valet mode responsive to said valet switch and signals from the at least one temporary remote transmitter.

53. A vehicle security system comprising;
a plurality of uniquely-coded remote transmitters comprising at least one temporary remote transmitter and at least one long-term remote transmitter; and
at least one controller for learning respective codes of said uniquely-coded remote transmitters to enable performance of a security function based upon signals received therefrom;
said at least one controller also having at least one selectable feature that changes based upon a predetermined event.

54. A vehicle security system according to claim 53 further comprising a valet switch connected to said controller; wherein said at least one selectable feature comprises a valet switch enable/disable feature; and wherein said at least one controller is responsive to said valet switch when the valet switch enable feature is selected and is not responsive to said valet switch when said valet switch disable feature is selected.

55. A vehicle security system according to claim 53 wherein the predetermined event comprises the passage of a predetermined time.

56. A vehicle security system according to claim 53 wherein the predetermined event comprises a predetermined number of consecutive communications from the at least one long-term remote transmitter.

57. A vehicle security system according to claim 53 wherein the predetermined event comprises a predetermined distance traveled by the designated vehicle.

58. A vehicle security system according to claim 53 wherein the predetermined event comprises a predetermined number of vehicle ignition cycles.

59. A vehicle security system according to claim 53 wherein said at least one controller also deletes the at least one respective code of the at least one temporary remote transmitter and retains the at least one respective code of the at least one long-term remote transmitter based upon the predetermined event.

* * * * *